Figure 1:
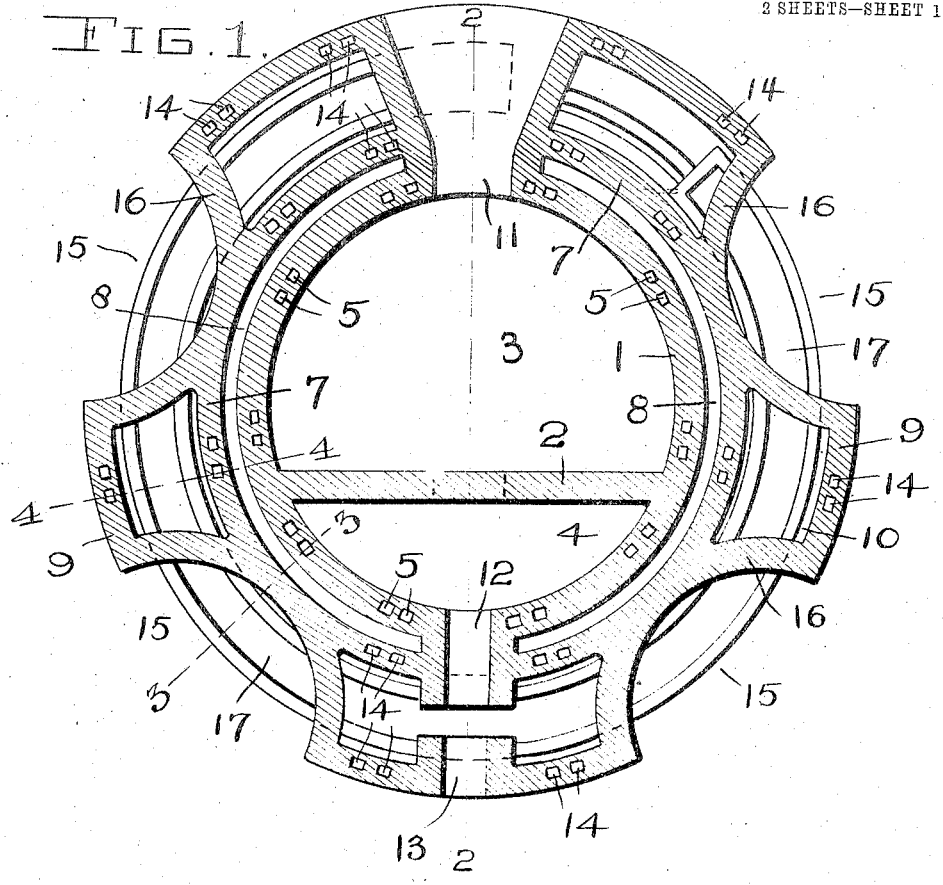

No. 850,233. PATENTED APR. 16, 1907.
C. J. KOENIG.
GLASS FURNACE.
APPLICATION FILED NOV. 30, 1906.

2 SHEETS—SHEET 1.

ATTEST.
H. O. Tonson
C. F. Ingersoll

INVENTOR.
Christian J. Koenig

No. 850,233.  
PATENTED APR. 16, 1907.  
C. J. KOENIG.  
GLASS FURNACE.  
APPLICATION FILED NOV. 30, 1906.  
2 SHEETS—SHEET 2.
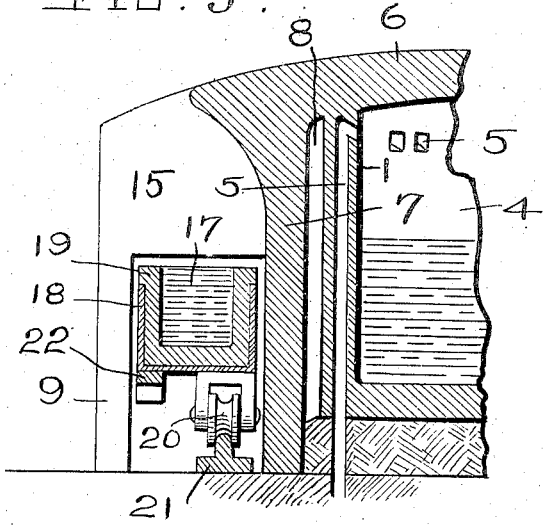
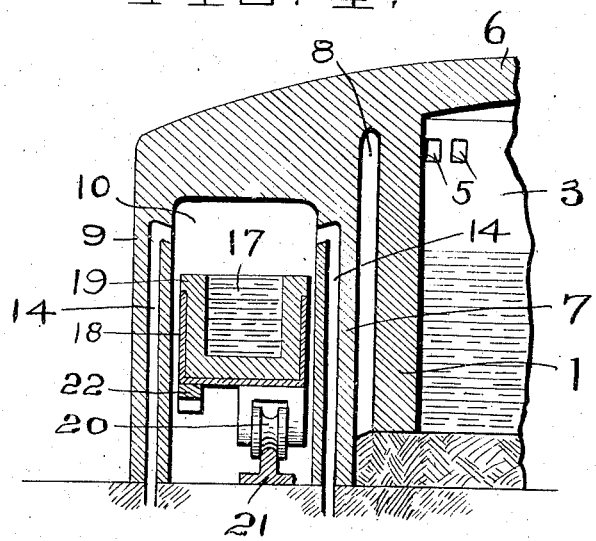
ATTEST.  
INVENTOR.

UNITED STATES PATENT OFFICE.

CHRISTIAN J. KOENIG, OF ALTON, ILLINOIS.

GLASS-FURNACE.

No. 850,233.      Specification of Letters Patent.      Patented April 16, 1907.

Application filed November 30, 1906. Serial No. 345,631.

*To all whom it may concern:*

Be it known that I, CHRISTIAN J. KOENIG, a citizen of the United States, residing at Alton, county of Madison, and State of Illinois, have invented certain new and useful Improvements in Glass-Furnaces, of which the following is a full, clear, and exact description.

My invention relates to a glass-furnace which is particularly adapted for feeding or delivering molten glass to a number of automatic glass-blowing machines; and the principal object of my invention is to construct a glass-furnace having a movable trough which receives the molten glass from the melting-chamber of the furnace and delivers said glass to the blowing-machines, which are located adjacent the outer wall of the furnace.

A further object of my invention is to combine a trough with a glass-furnace, which trough is heated, so as to maintain the glass in a proper working condition, and there being means provided for imparting a reciprocating rotary motion to said trough.

This application should be read in connection with the application filed by me June 20, 1906, Serial No. 322,495.

My present invention consists of certain novel features of construction and arrangement of parts which will be hereinafter more fully described, claimed, and shown in the drawings, in which—

Figure 2:
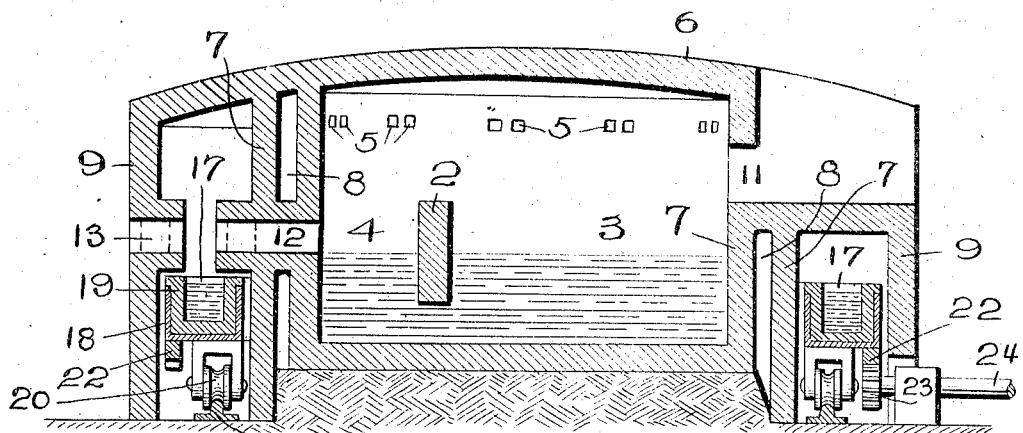

Figure 1 is a horizontal section taken through my improved furnace immediately above the movable trough therein. Fig. 2 is a vertical section taken on a line 2 2 of Fig. 1. Fig. 3 is a vertical section taken on a line 3 3 of Fig. 1. Fig. 4 is a vertical section taken on a line 4 4 of Fig. 1.

Referring by numerals to the accompanying drawings, 1 designates a circular wall which surrounds the chamber in which the glass is melted, said chamber being divided by a transversely-arranged wall 2 into a melting-tank 3 and a clearing or working-out tank 4. Formed in the circular wall 1 at suitable distances apart are the vertically-arranged pairs of air and gas inlet ducts 5, the upper ends of which discharge into the furnace immediately above the arch or top 6 thereof. Surrounding the wall 1 is a circular wall 7, there being an annular air-space 8 formed between the walls 1 and 7, and surrounding said wall 7 and arranged a suitable distance away is a circular wall 9, and thus a circular compartment 10 is formed between the walls 7 and 9, which compartment is occupied by the movable trough.

Formed through the walls 1, 7, and 9 to the rear of the chamber 8 is an opening 11, through which the charge or material to be melted is delivered to the furnace, and formed through the walls 1 and 7 directly opposite this opening 11 is an opening 12, which leads from the clearing-chamber and is for the purpose of delivering the molten glass to the duct or canal.

Formed through the wall 9 directly opposite the opening 12 is an opening 13, which is for the purpose of giving access to the opening 12 to control the discharge of molten glass therethrough.

Formed in the walls 7 and 9 at suitable distances apart are the vertically-disposed pairs of gas and air inlet ducts 14, the upper ends of which discharge into the upper portion of the compartment 10.

Intersecting the outer wall 9 are inwardly-extending recesses or niches 15, which are to be occupied by the automatic glass-blowing machines, and auxiliary walls 16 are formed immediately back of these recesses and extend from the outer wall 9 to the wall 7.

Arranged for reciprocating rotary motion in the circular chamber 10 is a trough or receptacle 17 in the form of a circular arc and which is constructed of an outer metallic shell 18, lined with fire-brick or fire-clay tile 19, the top of which trough is open, and fixed on the under side thereof is a series of grooved wheels 20, which travel upon a suitably-arranged track 21, located on the bottom of the compartment 10.

A circular rack 22 is fixed on the under side of this trough, and meshing therewith is a pinion 23, carried by a shaft 24, which is driven in any suitable manner.

The contents of the chamber 3 in the furnace and in the clearing-compartment 4 are maintained at the proper temperature by the heat from the ignited gases which are delivered through the ducts 5, and the molten glass from the clearing-chamber 4 is allowed to discharge through the opening 12 into the trough 17. The molten glass while in said trough is maintained at the proper temperature by the heat of the burning gases which are delivered through the ducts 14. While the furnace is in use the shaft 24 is rotated for a certain number of revolutions in one direction, and then the rotary motion is reversed and the pinion 23, meshing with the rack 22, consequently imparts a corresponding reciprocating rotary motion to the trough 17.

The glass-blowing machines located in the recesses 15 are fed by the automatic glass-gathering mechanism, which dips into the exposed open top of the trough, and as said trough is constantly in motion the glass after exposure in one of the recesses is carried into the chamber or compartment 10 and there heated, so as to be maintained in a proper working condition when carried into the next adjacent recess or niche.

A furnace of my improved construction provides a convenient arrangement whereby the glass is primarily heated and then delivered to the trough, and while in said trough the glass is maintained at the proper temperature by the direct application of heat in the trough-chamber.

I claim—

1. The combination with a glass-furnace, of a trough of circular-arc form which receives molten glass from said glass-furnace.

2. The combination with a glass-furnace, of a trough of circular-arc form which receives molten glass from said glass-furnace, and means whereby reciprocating rotary motion is imparted to said trough.

3. The combination with a glass-furnace, of an annular chamber formed around the furnace, and a trough of circular-arc form arranged for operation in said annular chamber and which trough receives molten glass from the furnace.

4. The combination with a glass-furnace, of an annular chamber formed around the furnace, a trough of circular-arc form arranged for operation in said annular chamber and which trough receives molten glass from the furnace, and means whereby reciprocating rotary motion is imparted to the trough.

5. The combination with a glass-furnace, of a trough of circular-arc form which receives molten glass from the glass-furnace, and means whereby the glass is heated while in the trough.

6. The combination with a glass-furnace, of a trough of circular-arc form which receives molten glass from the glass-furnace, means whereby the glass is heated while in the trough, and means whereby reciprocating rotary motion is imparted to said trough.

7. The combination with a glass-furnace, of walls arranged around the furnace to form a circular chamber, there being an annular air-space between the furnace-wall and the adjacent wall of the chamber, and a trough arranged for operation in said circular chamber which trough receives molten glass from the furnace.

8. The combination with a glass-furnace, of walls arranged around the furnace to form a circular chamber, there being an annular air-space between the furnace-wall and the adjacent wall of the chamber, a trough arranged for operation in said circular chamber which trough receives molten glass from the furnace, and means whereby reciprocating rotary motion is imparted to said trough.

CHRISTIAN J. KOENIG.

Witnesses:
   H. O. TONSOR,
   C. F. INGERSOLL.